US010897562B2

(12) United States Patent
Watanabe

(10) Patent No.: US 10,897,562 B2
(45) Date of Patent: *Jan. 19, 2021

(54) IMAGING DEVICE INCLUDING A PLURALITY OF LIGHT EMITTING ELEMENTS

(71) Applicant: CANON KABUSHIKI KAISHA, Tokyo (JP)

(72) Inventor: Tatsuya Watanabe, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/109,448

(22) Filed: Aug. 22, 2018

(65) Prior Publication Data
US 2018/0367718 A1 Dec. 20, 2018

Related U.S. Application Data

(62) Division of application No. 15/213,045, filed on Jul. 18, 2016, now Pat. No. 10,110,793.

(30) Foreign Application Priority Data

Jul. 23, 2015 (JP) .................. 2015-146072

(51) Int. Cl.
H04N 5/225 (2006.01)
H04N 5/232 (2006.01)
H04N 5/235 (2006.01)
G03B 5/00 (2006.01)

(52) U.S. Cl.
CPC ............ H04N 5/2256 (2013.01); G03B 5/00 (2013.01); H04N 5/2354 (2013.01); H04N 5/23241 (2013.01); H04N 5/23296 (2013.01); H04N 5/232411 (2018.08); G03B 2205/0046 (2013.01); G03B 2215/0575 (2013.01)

(58) Field of Classification Search
CPC ............ H04N 5/2256; H04N 5/23296; H04N 5/23241; H04N 5/2354; G03B 2215/05–0596; G03B 15/02–05; F21V 33/0052
See application file for complete search history.

(56) References Cited

U.S. PATENT DOCUMENTS 8,947,527 B1* 2/2015 Postovalov ............ H04N 7/183
348/142
10,110,793 B2* 10/2018 Watanabe .......... H04N 5/23296
2013/0064531 A1* 3/2013 Pillman .............. H04N 5/23296
396/62

FOREIGN PATENT DOCUMENTS

JP 2005-341569 A 12/2005
JP 2006-259107 A 9/2006
JP 2012-128128 A 7/2012

* cited by examiner

Primary Examiner — Christopher K Peterson
(74) Attorney, Agent, or Firm — Canon U.S.A., Inc., IP Division

(57) ABSTRACT

An imaging device includes, an element installation plane configured to install light emitting elements in a plane perpendicular to an optical axis. The element installation plane includes a first installation position relatively long in distance from an optical axis of a lens unit and a second installation position relatively short in distance therefrom. At least one of the light emitting elements is installed at the second installation position.

15 Claims, 8 Drawing Sheets

IMAGING DEVICE INCLUDING A PLURALITY OF LIGHT EMITTING ELEMENTS

CROSS-REFERENCE TO RELATED APPLICATIONS

The present application is a divisional of U.S. patent application Ser. No. 15/213,045, filed Jul. 18, 2016, entitled "IMAGING DEVICE", the content of which is expressly incorporated by reference herein in its entirety. Further, the present application claims priority from Japanese Patent Application No. 2015-146072, filed Jul. 23, 2015, which is also hereby incorporated by reference herein in its entirety.

BACKGROUND OF THE INVENTION

Field of the Invention

The present invention relates to an imaging device, and particularly relates to an imaging device with a light emitting unit.

Description of the Related Art

Known in the related art is an imaging device using an LED as lighting. In this imaging device, in a case where an amount of current is increased in order to increase an amount of irradiating light, temperature is increased by heat generation of the LED itself, which has resulted in a decrease in light amount.

In response to this, a ring light equipped with a heat sink for dissipating heat is disclosed in Japanese Patent Application Laid-Open No. 2007-212764. Disclosed in Japanese Patent Application Laid-Open No. 2013-156347 is an imaging device with a plurality of light sources mounted on a flexible substrate and connected to a seat formed using metal with high heat dissipation as a heat dissipating member.

SUMMARY OF THE INVENTION

To achieve the abovementioned object, the present invention provides an imaging device including a lens unit configured to image an object, an imaging unit configured to convert light, with which an image is formed by the lens unit, into an image signal, an element installation plane configured to install light emitting elements for irradiating the object in a plane perpendicular to an optical axis of the lens unit, a first light emitting element installed in the element installation plane; a plurality of second light emitting elements installed in the element installation plane and having a narrower light distribution range than the first light emitting element, a power supply unit configured to supply power to the first light emitting element and the second light emitting elements, and a control unit configured to control power supply of the power supply unit, wherein the control unit controls power supply to light either the first light emitting element or the second light emitting elements, the element installation plane includes a first installation position relatively long in distance from the optical axis of the lens unit and a second installation position relatively short in distance therefrom, and at least one of the second light emitting elements is installed at the second installation position.

Further features of the present invention will become apparent from the following description of exemplary embodiments (with reference to the attached drawings).

DESCRIPTION OF THE EMBODIMENTS

Figure 1:
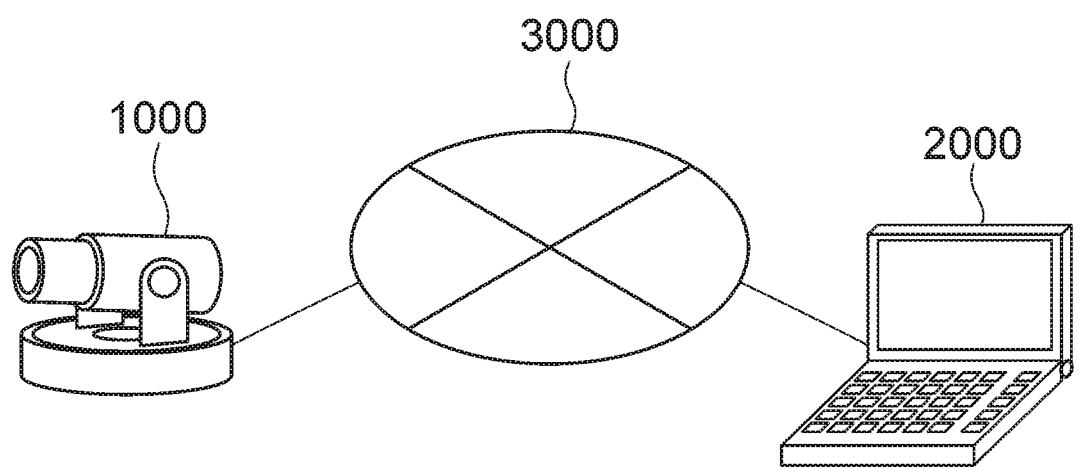
FIG. 1 is a configuration diagram of an imaging system according to an embodiment of the present invention.

Preferred embodiments of the present invention will be described below in detail with reference to the attached drawings. Each configuration illustrated in the following embodiments is only an example, and the present invention is not limited to the configurations illustrated in the drawings.

First Embodiment

FIG. 1 is a system configuration diagram including an imaging device 1000. A device 2000 is a client device indicating an external device in the present invention. The imaging device 1000 and the client device 2000 are communicably connected to each other via a network 3000. The client device 2000 transmits various types of control commands to the imaging device 1000. The control commands include commands for starting/finishing imaging, starting/finishing distribution of a captured image, and controlling a camera, for example. The imaging device 1000 that has received each control command transmits a response to the received control command to the client device 2000.

The imaging device 1000 in the present embodiment is an example of a communication device that communicates with the client device 2000 via a network, and is, for example, a monitoring camera that captures an image of a predetermined object. More specifically, it is assumed to be a network camera used for monitoring. The client device 2000 in the present embodiment is an example of the external device such as a PC. A monitoring system comprising the imaging device 1000 and the external device 2000 in the present embodiment is equivalent to an imaging system.

The network 3000 is assumed to include, for example, a plurality of routers, switches, and cables that satisfy a communication standard such as Ethernet (registered trademark). However, in the present embodiment, the communication standard, scale, and configuration of the network 3000 does not matter as long as communication can be carried out between the imaging device 1000 and the client device 2000.

For example, the network 3000 may include the Internet, wired local area network (LAN), wireless LAN, and wide area network (WAN). The imaging device 1000 in the present embodiment may be compatible with, for example, Power over Ethernet (PoE) (registered trademark) and may be supplied with electric power via a LAN cable.

Figure 2:
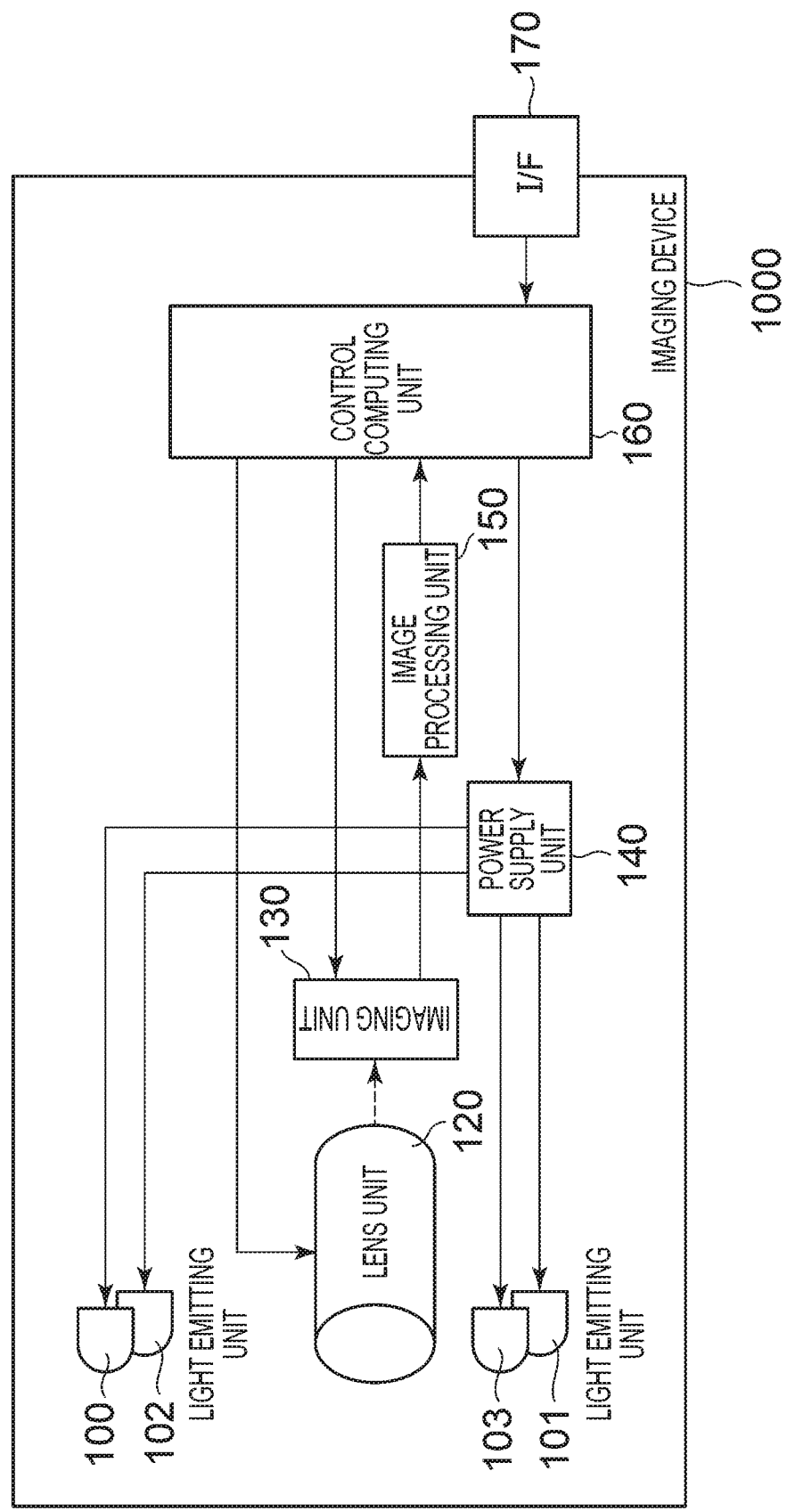
FIG. 2 is a diagram illustrating an overall configuration of an imaging device in a first embodiment.

An overall configuration of the imaging device with two light emitting units to be simultaneously lighted according to the first embodiment of the present invention will be described below with reference to FIG. 2. The imaging device 1000 in the present embodiment includes light emitting units 100 to 103, a lens unit 120, an imaging unit 130, a power supply unit 140, an image processing unit 150, a control computing unit 160, and an I/F 170.

An image of a scene (object image) to be captured by the imaging device 1000 is formed in the imaging unit 130 by the lens unit 120. The lens unit 120 includes an unillustrated zoom mechanism, a diaphragm mechanism, a focusing mechanism, a camera shake correction mechanism, and the like. Each mechanism is drive-controlled by control from the control computing unit 160 which will be described later. For example, the zoom mechanism included in the lens unit 120 receives a control signal related to changes in zoom position from the control computing unit 160 and operates so as to achieve a designated zoom position (focal length).

A lens used in the lens unit 120 may be a single focus lens without the zoom mechanism. The zoom mechanism of the lens unit 120 may be operated manually by a user. In this case, the lens unit 120 transmits the zoom position to the control computing unit 160. A panning mechanism or a tilting mechanism for changing an imaging field angle of the imaging unit may be provided as well.

The imaging unit 130 has, for example, an imaging element, an A/D conversion circuit, a gain circuit, and an image processing circuit such as defect correction processing. The imaging element is a CCD or a CMOS sensor that outputs an analogue signal in accordance with the light with which an image is formed by the lens unit 120. Then, the analogue signal to be output from the imaging element is converted into a digital signal by the A/D conversion circuit and sent to the image processing unit 150 as an image signal.

The image processing unit 150 subjects the image signal received from the imaging unit 130 to predetermined image processing and outputs an image file. For example, development processing, filtering processing, sensor correction, and noise reduction will be carried out. Here, details of the image processing will not be described. The development processing includes, for example, demosaicing processing, color adjustment processing, and processing for compression coding by a predetermined coding system such as H.264.

The image processing unit 150 also evaluates image adjustment based on the image signal. More specifically, diaphragm adjustment of the lens unit 120, adjustment of exposure time and A/D conversion of the imaging unit 130, and light amount adjustment of the light emitting units 100 to 103 are evaluated. The image processing unit 150 transmits the evaluation results to the control computing unit 160 as evaluation values. The control computing unit 160 generates a control signal in accordance with the evaluation values received from the image processing unit 150 for transmitting to the lens unit 120, the imaging unit 130, and the power supply unit 140. By repeating a series of these operations, it becomes possible to adjust parameters of the lens unit 120, the imaging unit 130, and the power supply unit 140 such that optimal images can be obtained.

The control computing unit 160 includes a CPU for controlling the imaging device 1000, controls elements such as the lens unit 120, the imaging unit 130, and the power supply unit 140, and generates control signals to be transmitted thereto, respectively. The control computing unit 160 also includes an unillustrated memory. The memory is used as a storage area of various types of data such as the image file generated by the image processing unit 150, a program storage area to be executed by the control computing unit 160 which will be described later, and a work area of a program being executed. The control computing unit 160 can accept an instruction from the user via the I/F 170 which will be described later.

The I/F 170 includes an interface to be connected to the network 3000 and accepts via the network 3000 control commands including the instructions from the user at the external device 2000. After each of the accepted control commands is subjected appropriate packet processing, contents thereof are determined by the control computing unit 160. The control computing unit 160 provides, for example, control and parameter setting of each component of the imaging device 1000 based on the contents of the control commands as necessary. The I/F 170 outputs to the network 3000 the image file to be output from the image processing unit 150.

The light emitting units 100 to 103 include light emitting elements that emit light in accordance with current to be supplied from the power supply unit 140. The light emitting units 100 to 103 have respective light distribution characteristics, but two or more of the light distribution characteristics may be the same or different. Wavelengths of light sources used for the light emitting units 100 to 103 are not considered. Types of the light sources such as an HID lamp, an LED, and a laser are not considered either. In the present embodiment, the light emitting units 100 and 101 and the light emitting units 102 and 103 are equivalent to the light emitting units to be respectively and simultaneously lighted.

The power supply unit 140 adjusts current to be supplied to the light emitting units 100 to 103 in accordance with the control signal received from the control computing unit 160. However, the control computing unit 160 is assumed to generate the control signal such that the same magnitude of current is supplied to a combination of the light emitting units 100 and 101 or one of the light emitting units 102 and 103. The current adjustment can also be realized by serially connecting the light emitting units 100 and 101 and the light emitting units 102 and 103 for commonalization of current supply circuits. The power supply unit 140 may include either a dedicated power supply IC for generating constant current or a discrete circuit.

Figure 3:
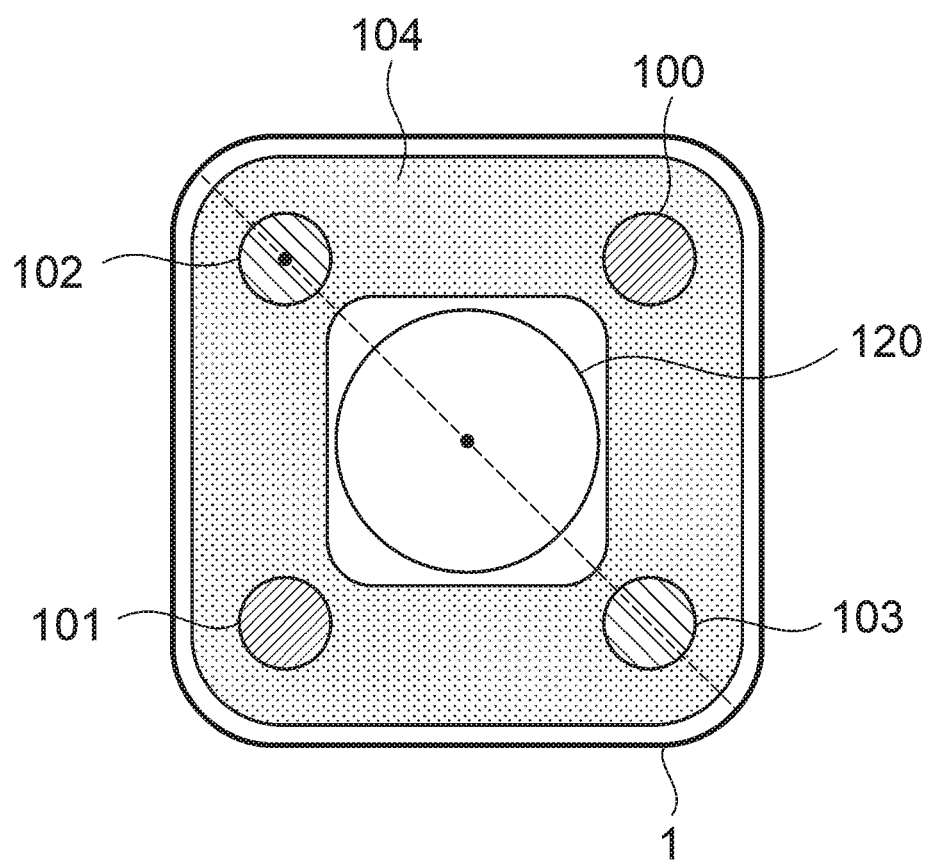
FIG. 3 is a diagram illustrating a layout of light emitting units in the first embodiment.

A layout of the light emitting units 100 to 103 in the present embodiment is illustrated in FIG. 3. FIG. 3 illustrates layouts of the lens unit 120 and the light emitting units 100 to 103 when an imaging device 1 is viewed from a side of the lens unit 120 (in other words, viewed from an object side). A light emitting unit installable area 104 is an area where the light emitting units 100 to 103 can be installed, and is equivalent to an element installation plane. The area is formed of, for example, a substrate or a die-cast member, more specifically, a substrate, die-cast member, or the like arranged in a periphery of an optical axis of the lens unit 120, and has a plane perpendicular to the optical axis. Then, two sets of two light emitting units to be respectively and simultaneously lighted, the light emitting units 100 and 101 and the light emitting units 102 and 103, are installed in the plane perpendicular to the optical axis. Each set of the light emitting units is arranged at a symmetric position that is a diagonal direction across the lens unit 120 within a range of the light emitting unit installable area 104. Therefore, in a case where the light emitting units are arranged in the light emitting unit installable area 104, it is possible to relatively secure distances among installation positions of respective light emitting units by arranging in oblique portions rather than arranging in an upper portion or side portions of the lens unit 120 in FIG. 3. This is because the oblique portions of the lens unit 120 correspond to corner portions due to a substantially rectangular shape of a housing of the imaging device 1 of the present invention (at least when viewed from the side of the lens unit 120). In a case where the housing is not substantially rectangular but elliptic, effects similar to the present embodiment can be obtained by arranging the light emitting units in a long axis direction.

As described above, the control computing unit 160 in the present embodiment controls lighting of either a combination of the light emitting units 100 and 101 or a combination of the light emitting units 102 and 103. Thus, in the layout of FIG. 3, the light emitting units 100 to 103 are always lighted by a combination of the light emitting units diagonally arranged across the lens unit 120. The diagonal arrangement is, as illustrated by a broken line of FIG. 3, equivalent to an arrangement, on a line connecting an arbitrary light emitting unit and the optical axis of the lens unit 120, of other light emitting unit.

Figure 4:
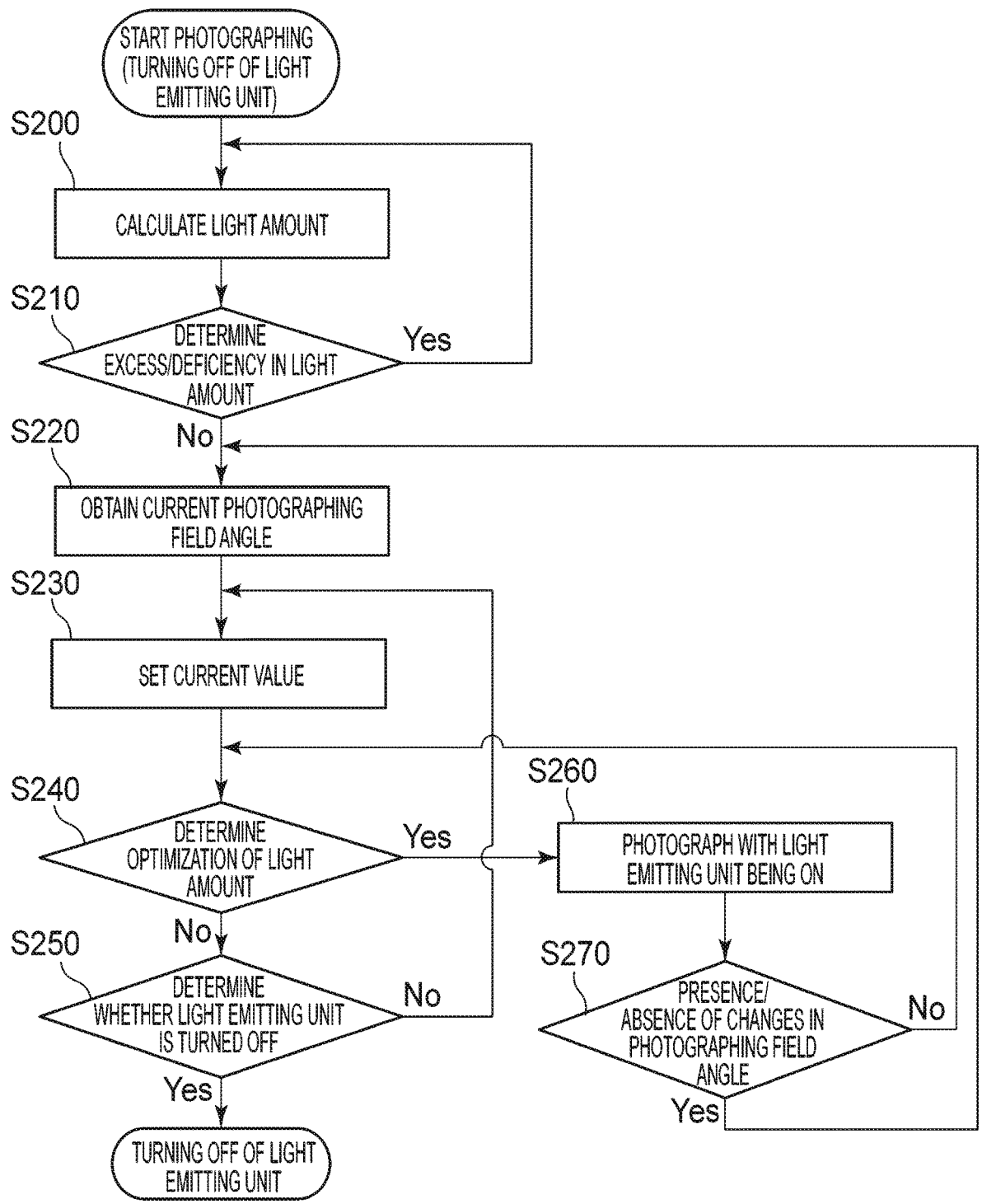
FIG. 4 is a flowchart illustrating a light emitting sequence in the first embodiment.

An example of light emitting sequence processing of the imaging device 1000 in the present embodiment is illustrated in FIG. 4. This processing is carried out by the control computing unit 160. It is assumed that the light emitting units 100 to 103 are turned off at the time when this processing is started.

In step S200, the control computing unit 160 obtains a light amount of the object to be imaged. Specifically, the imaging unit 130 transmits an image signal that has been imaged at the time of outputting to the image processing unit 150. The image processing unit 150 that has received the image signal subjects the image signal to image processing and calculates the light amount in the captured image. The control computing unit 160 obtains the light amount calculated by the image processing unit 150 as an evaluation value. Then, the processing shifts to step S210.

In step S210, the control computing unit 160 determines excess or deficiency in light amount with respect to the evaluation value obtained in step S200. Specifically, the control computing unit 160 compares the evaluation value received from the image processing unit 150 with a predetermined threshold for determining excess or deficiency in light amount. This threshold represents a minimum required light amount for imaging and is stored in advance in the memory in the control computing unit 160. In a case where the evaluation value is equal to or higher than the threshold, the control computing unit 160 determines that the light amount is sufficient and returns the processing to step S200. Then, imaging is continued with the light emitting units turned off. In a case where the light amount is more than expected, it is possible to change, for example, diaphragm or shutter speed for dimming entering light. On the other hand, in a case where the evaluation value is less than the threshold, the light amount is determined as deficient and the processing shifts to step S220. The predetermined threshold may be changed in accordance with the condition of the imaging device 1000. As an example, the predetermined threshold may be changed in accordance with the zoom position by the zoom mechanism of the lens unit 120.

In step S220, the control computing unit 160 obtains information on imaging field angles from the lens unit 120 and selects a combination of the light emitting units to be lighted. Specifically, the control computing unit 160 obtains current zoom information from the lens unit 120 and calculates an imaging field angle based on the information. In addition, the control computing unit 160 selects light emitting units with light distribution characteristics appropriate for the calculated imaging field angle. That is, either the combination of the light emitting units 100 and 101 or that of the light emitting units 102 and 103 is selected. As described above, only one set of the combination of the light emitting units is simultaneously lighted. Therefore, the subsequent processing is carried out only for the combination of the light emitting units selected in step S220. Then, the processing shifts to step S230.

In step S230, the control computing unit 160 carries out processing for setting current to be supplied to the selected combination of the light emitting units. Specifically, the control computing unit 160 calculates a current value to be supplied to the light emitting units selected in step S220 based on the light amount calculated in step S200. Then, the calculated current value is transmitted to the power supply unit 140 together with information on which combination of the light emitting units is to be lighted. Based on the information, the power supply unit 140 starts designated current supply to the selected light emitting units. Then, the processing shifts to step S240.

In step S240, the control computing unit 160 determines whether the set current value is appropriate. Specifically, determination is made using the processing similar to steps S200 and S210. Different from the above steps is that the evaluation value calculated in step S240 is a value indicating whether the light emitting units emit light vertically within a certain range with respect to an optimal light amount. In a case where the evaluation value is equal to or higher than the threshold, it is determined that the optimal light amount is emitted from the light emitting units, that is, that the set current value is optimal, and the processing shifts to step S260. In a case where the evaluation value is equal to or less than the threshold, it is determined that the light amount is too large or too small, and the processing shifts to step S250.

In step S250, the control computing unit 160 determines whether or not it is necessary to light each light emitting unit. Specifically, in a case where the current value set in the power supply unit 140 is equal to or higher than a certain value, it is determined that lighting of the light emitting units is necessary and the processing is returned to step S230 in order to reset the current value. In a case where the current value is less than a certain value, determining that the light amount is sufficient without lighting the light emitting units, the control computing unit 160 transmits information so as to stop supplying current to the power supply unit 140, turns off the light emitting units, and finishes the processing.

On the other hand, in step S260, the control computing unit 160 carries out processing for lighting the light emitting units under conditions set to step S240. Then, the processing shifts to step S270.

In step S270, the control computing unit 160 determines whether there are changes in imaging field angle based on the zoom information obtained in step S260. In a case where there are changes, the processing is returned to step S220. In a case where there are no changes, the processing is returned to step S240. Then, in a case where there are no changes since in imaging conditions, a processing loop of steps S260, S270, and S240 is repeated.

In step S270, changes in imaging field angle are determined based on the zoom information, but may be determined based on operational information of the panning or tilt mechanism. In the image processing unit 150, it may also be determined, by providing a determining unit configured to determine scenes based on, for example, the light amount and color information in the captured image, that the imaging field angle has changed in accordance with the determination results by the determining unit.

In the present embodiment, an example of controlling each set of the light emitting units to exclusively emit light is shown, but a plurality of sets may be temporarily and simultaneously lighted in switching between sets to emit light. In this case, it is preferred that as light emitting amount of one set is decreased, that of the other set is increased.

Figure 5A:
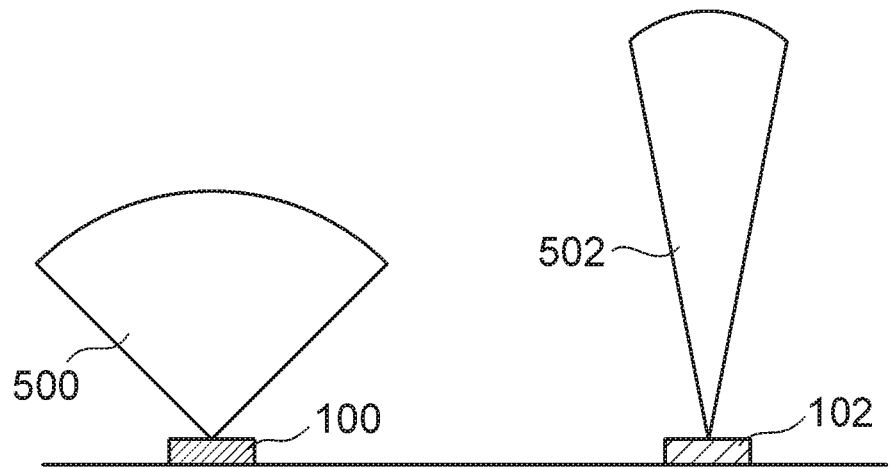
FIGS. 5A and 5B are diagrams illustrating light distribution characteristics of the light emitting units in the first embodiment.
Figure 5B:
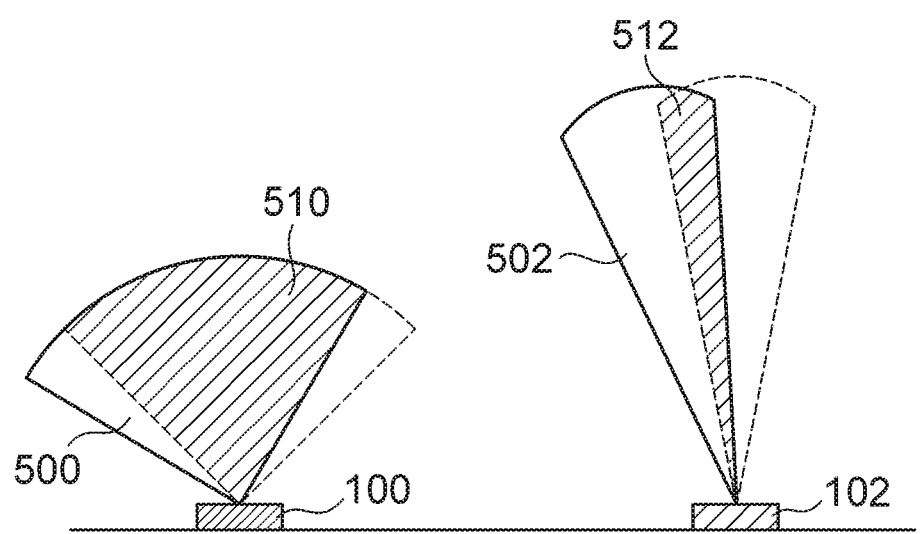

FIGS. 5A and 5B are diagrams illustrating light distribution characteristics of the light emitting units 100 and 102. As illustrated in FIG. 5A, a light distribution range 502 of the light emitting unit 102 is narrower and a reachable distance of irradiating light thereof is longer than a light distribution range 500 of the light emitting unit 100. The light distribution characteristics of the light emitting units 100 and 101 and those of the light emitting units 102 and 103 are similar, respectively. In this case, it is preferred to light the light emitting units 100 and 101 in a case where the zoom position of the lens unit 120 is closer to a wide angle side. In a case where the zoom position of the lens unit 120 is closer to a telephoto side, it is preferred to light the light emitting units 102 and 103. Furthermore, the object to be imaged is assumed to be positioned farther away with increasing zoom magnification of the lens unit 120. In this case, it is not always necessary to irradiate a wide range, and it is necessary to increase electric power to be supplied from the power supply unit 140 in order for the light from the light emitting units to reach the object. Thus, even in a case where a power supply amount increases, the layout in the present embodiment can ensure distances among the light emitting units and improve heat dissipation.

In addition, as illustrated in FIG. 5B, the light emitting units may have a deviation of a light distribution direction depending on variations in components themselves or mounting conditions thereof. Even if the light emitting units 100 and 102 have similar deviations of light distribution directions, an overlap 512 of an irradiation range of the light emitting unit 102 is less than an overlap 510 of the irradiation range of the light emitting unit 100. That is, the light distribution direction of the light emitting unit 102 and an imaging direction of the lens unit 120 are required to be matched with high accuracy compared with the light emitting unit 100. Even in a case like this, as with the layout of the present embodiment, arrangement across the lens unit 120 within a range of the light emitting unit installable area 104 can well match the imaging direction of the lens unit 120 and the light distribution directions of a plurality of light emitting units.

In the present embodiment, the light emitting units are formed into one set based on the light distribution characteristics, but may be formed into one set based on wavelength of light emitting light, light emitting frequency, power consumption, or amount of heat generation of each light emitting unit beside the light distribution characteristics. In this case, it is possible to efficiently dissipate heat by arranging sets easier to dissipate heat (with a large amount of heat generation) in the layout of the present embodiment.

As described above, the layout that has been illustrated in the first embodiment can ensure distances among the light emitting units and improve heat dissipation.

Second Embodiment

Figure 6:
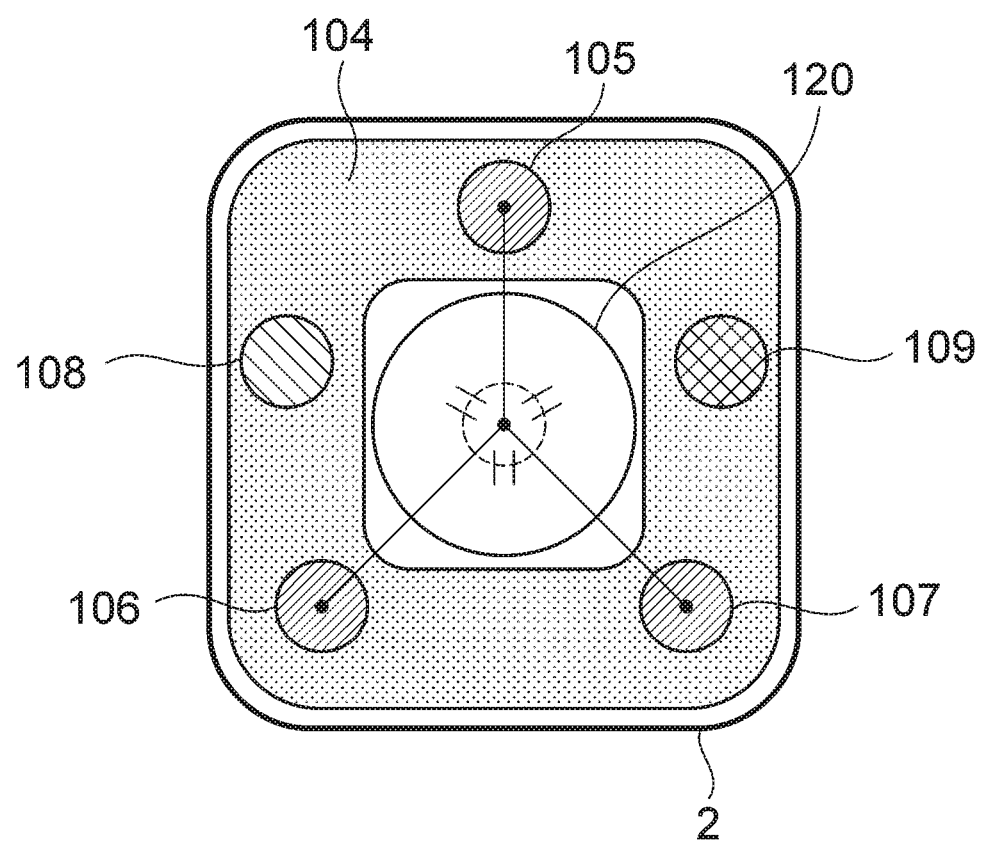
FIG. 6 is a diagram illustrating a layout of light emitting units in a second embodiment.

A layout of light emitting units in a case where there are three or more light emitting units to be simultaneously lighted according to a second embodiment of the present invention will be described below with reference to FIG. 6. Descriptions of configurations similar to those in the first embodiment will be omitted.

In the present embodiment, it is assumed that light emitting units 105, 106, and 107 are simultaneously lighted, while light emitting units 108 and 109 are separately lighted. An imaging device 1000 in the present embodiment has the same configuration as the imaging device 1000 illustrated in the first embodiment excluding the configuration of the light emitting units.

The three light emitting units 105, 106, and 107 to be simultaneously lighted are arranged at substantially equal intervals at rotationally symmetric positions around a center of an optical axis of a lens unit 120. Even in a case where the number of light emitting units to be simultaneously lighted is increased to four or five, it is preferred that the light emitting units are arranged at equal intervals at rotationally symmetric positions. The light emitting units 108 and 109 may be arranged anywhere within a range of a light emitting unit installable area 104. The layout illustrated in FIG. 6 is an example, and other layouts can be made as long as the conditions described above are satisfied.

Figure 7A:
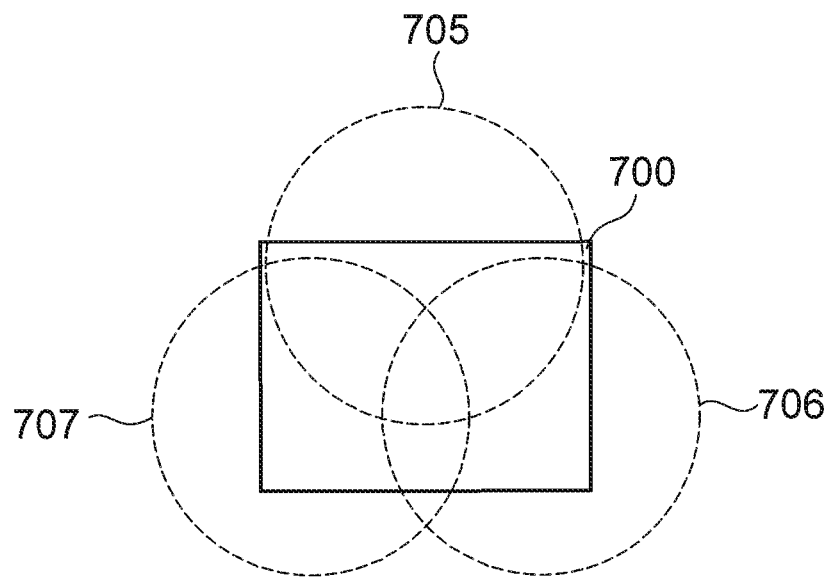
FIGS. 7A and 7B are diagrams illustrating irradiation ranges of the light emitting units in the second embodiment.
Figure 7B:
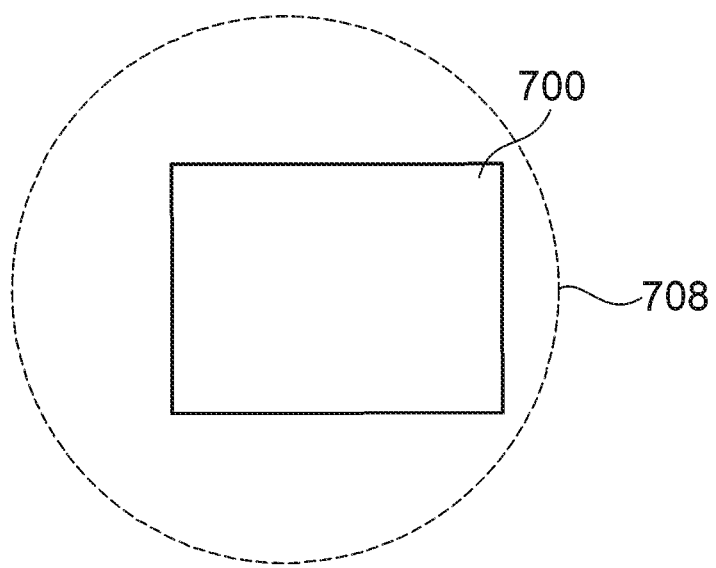

FIGS. 7A and 7B are diagrams illustrating positional relationship between irradiation ranges of the light emitting units and a field angle range 700 of the lens unit 120. In the present embodiment, each irradiation range of the light emitting units 105 to 107 is narrower than that of the light emitting unit 108 or 109.

FIG. 7A illustrates positional relationship between irradiation ranges 705 to 707 of the light emitting units 105 to 107 and the field angle range 700 of the lens unit 120 when a zoom position of the lens unit 120 is on a telephoto side. The irradiation ranges 705 to 707 of the light emitting units 105 to 107 are relatively narrow due to priority on reachable distance. As a result, it is possible to irradiate the entire field angle range 700 by superimposing a plurality of irradiation ranges. On the other hand, FIG. 7B illustrates positional relationship between an irradiation range 708 of the light emitting unit 108 or 109 when the zoom position of the lens unit 120 is on a wide angle side and the field angle range 700 of the lens unit 120. The irradiation range 708 of the light emitting unit 108 or 109 is wide. Therefore, it is possible to irradiate the field angle range 700 by a single irradiation range.

Even in a case like this, as with the layout of the present embodiment, arrangement of the lens unit 120 at substantially equal intervals at rotationally symmetric positions within a range of the light emitting unit installable area 104 can well match the field angle range of the lens unit 120 and the irradiation ranges of a plurality of light emitting units. In a case where a plurality of light emitting units are arranged, when they are arranged at substantially equal intervals at rotationally symmetric positions of the lens unit 120, it is preferred to preferentially arrange the light emitting units with narrow irradiation ranges.

A light emitting sequence is the same as the imaging device 1000 illustrated in the first embodiment, and thus descriptions thereof are omitted. However, an option of the light emitting units in step S220 in the present embodiment is any one of a combination of the light emitting units 105, 106, and 107, the light emitting unit 108, and the light emitting unit 109.

As illustrated in the second embodiment above, even when the number of the light emitting units to be simultaneously lighted is three or more, the same effects as in a case where the number of light emitting units to be simultaneously lighted is two can be obtained by changing methods for arranging the light emitting units and the light emitting sequence.

Third Embodiment

Figure 8:
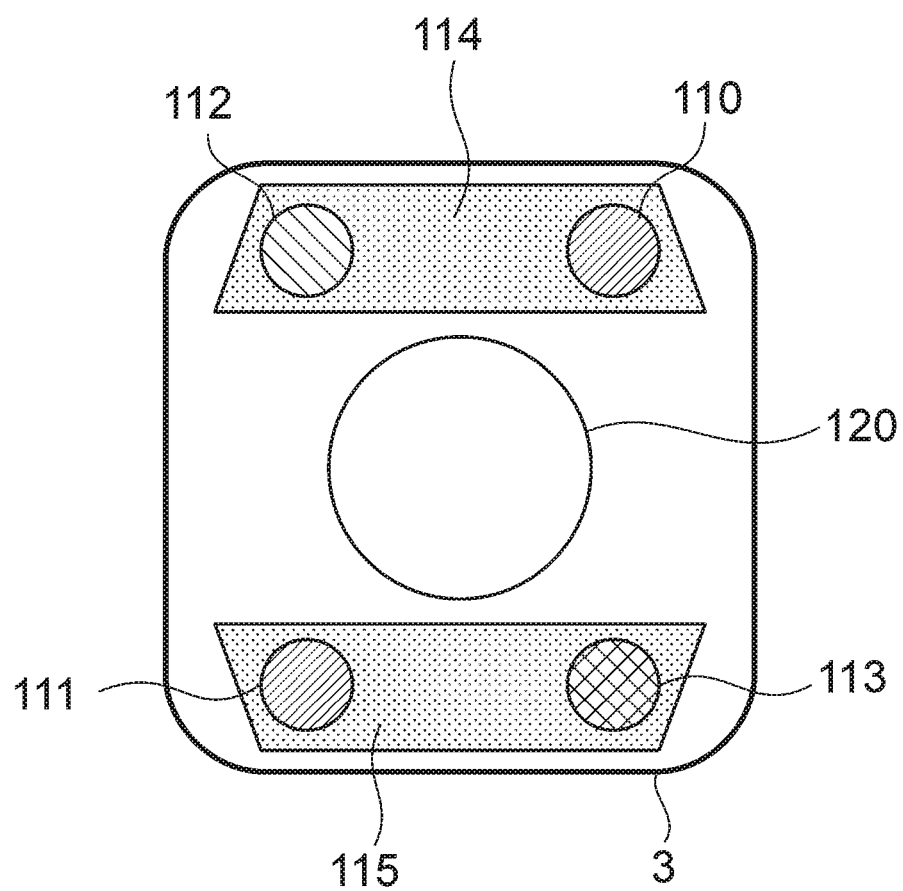
FIG. 8 is a diagram illustrating a layout of light emitting units in a third embodiment.

A layout of light emitting units in a case where a light emitting unit installable area 114 is divided according to a third embodiment of the present invention will be described below with reference to FIG. 8. Descriptions of configurations similar to those in the first embodiment will be omitted.

In the present embodiment, it is assumed that light emitting units 110 and 111 are simultaneously lighted and light emitting units 112 and 113 are separately lighted. There are provided two light emitting unit installable areas, light emitting unit installable areas 114 and 115. An imaging device 3 has the same configuration as the imaging device 1000 illustrated in the first embodiment excluding the above two points.

Light emitting unit installable areas 114 and 115 are obtained by dividing the light emitting unit installable area 104 in the first embodiment into two. The light emitting unit installable areas 114 and 115 are formed of, for example, printed circuit boards (PCBs) or flexible printed circuits (FPCs). However, division of the light emitting unit installable area in the present embodiment is aimed at dividing the area into two or more PCBs or FPCs for thermal separation.

Next, how the light emitting units 110 to 113 are arranged for the divided light emitting unit installable areas 114 and 115 will be described. The light emitting units 110 and 111 are, as described above, light emitting units to be simultaneously lighted, and thus arranged separately in the light emitting unit installable areas 114 and 115 and diagonally across a lens unit 120. The light emitting units 112 and 113 are lighted separately, and thus arranged at positions illustrated in FIG. 8. However, they may be arranged in either the light emitting unit installable area 114 or 115. As a result, the light emitting units to be simultaneously lighted are arranged thermally separated.

In the imaging device 3, a component that can serve as a heat source except the light emitting units 110 to 113, for example, a power supply unit 140 is arranged separately from both the light emitting unit installable areas 114 and 115. Furthermore, in a case where there are provided, in the light emitting unit installable area 104 of the first embodiment, heat dissipating units including heat dissipating members (such as a heat sink, a heat dissipating path, and a cooling air path by a fan) for dissipating heat generated by each light emitting unit, they are also divided for each area and installed in the respective light emitting unit installable areas.

A light emitting sequence is the same as the imaging device 1000 illustrated in the first embodiment. However, an option of the light emitting units in step S220 of the present embodiment is any one of a combination of the light emitting units 110 and 111, the light emitting unit 112, and the light emitting unit 113.

The layout illustrated in the third embodiment above can effectively increase heat dissipation. In the present embodiment, an example where the light emitting unit installable area is divided into two is illustrated, but the area may be divided into two or more. The power supply unit 140 may also be divided so as to correspond to each divided area. By dividing the power supply unit 140, heat generated by the power supply unit is dissipated, and thus, heat can be dissipated efficiently.

Preferred embodiments of the present invention have been described above using the first, second, and third embodiments, but the present invention is not limited to these embodiments and various types of modifications and changes can be made without departing from the spirit of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An imaging device comprising:
   a lens unit;
   an imaging unit configured to convert light with which an image is formed by the lens unit into an image signal;
   a housing configured to house the lens unit and the imaging unit and having a rectangular shape as viewed in a direction of an optical axis of the lens unit;
   a pair of first light emitting elements arranged diagonally across the lens unit at positions corresponding to corners of the housing respectively; and
   a second light emitting element and a third light emitting element arranged diagonally across the lens unit at positions corresponding to different corners of the housing respectively, said different corners being different from the corners where the first light emitting elements are arranged;
   wherein the pair of first light emitting elements have a light distribution angle smaller than that of the second light emitting element and that of the third light emitting element; and
   wherein the second light emitting element has a light distribution angle smaller than that of the third light emitting element.

2. The imaging device according to claim 1, further comprising:
   a control unit configured to control power supply to the pair of first light emitting elements, the second light emitting element and the third light emitting element;
   wherein the control unit performs control to supply power exclusively such that one of the pair of first light emitting elements, the second light emitting element, and the third light emitting element is turned on.

3. The imaging device according to claim 2,
   wherein the control unit includes
      a determination unit configured to determine a light amount of a captured image, and
      an acquisition unit configured to acquire an imaging field angle in a case where the light amount determined by the determination unit is not larger than a predetermined amount;
   wherein the control unit performs control to supply power to the pair of first light emitting elements in a case where the imaging field angle acquired by the acquisition unit is narrower than a predetermined field angle and supply power to the second light emitting element or the third light emitting element in a case where the imaging field angle acquired by the acquisition unit is not narrower than the predetermined field angle.

4. An imaging device comprising:
   a lens unit;
   an imaging unit configured to convert light with which an image is formed by the lens unit into an image signal;
   a housing configured to house the lens unit and the imaging unit and having a rectangular shape as viewed in a direction of an optical axis of the lens unit;

a pair of first light emitting elements arranged diagonally across the lens unit at positions corresponding to corners of the housing respectively; and a second light emitting element and a third light emitting element arranged diagonally across the lens unit at positions corresponding to different corners of the housing respectively, said different corners being different from the corners where the first light emitting elements are arranged; and a control unit configured to control power supply to the pair of first light emitting elements, the second light emitting element, and the third light emitting element;

wherein the control unit performs control to supply power exclusively such that one of the pair of first light emitting elements, the second light emitting element, and the third light emitting element is turned on.

5. The imaging device according to claim 4,
wherein the control unit includes
a determination unit configured to determine a light amount of a captured image, and
an acquisition unit configured to acquire an imaging field angle in a case where the light amount determined by the determination unit is not larger than a predetermined amount;
wherein the control unit performs control to supply power to the pair of first light emitting elements in a case where the imaging field angle acquired by the acquisition unit is narrower than a predetermined field angle and supply power to the second light emitting element or the third light emitting element in a case where the imaging field angle acquired by the acquisition unit is not narrower than the predetermined field angle.

6. The imaging device according to claim 4, further comprising:
a first substrate on which one of the pair of first light emitting elements and the second light emitting element are arranged; and
a second substrate on which the other of the pair of first light emitting elements and the third light emitting element are arranged.

7. An imaging device comprising:
a lens unit;
a first light emitting element;
a second light emitting element to which power is supplied in such a way as to be turned on simultaneously with the first light emitting element;
a third light emitting element to which power is supplied in such a way as to be turned on simultaneously with the first light emitting element and the second light emitting element;
a fourth light emitting element to which power is supplied in such a way as to be turned on at different timing from the first light emitting element, the second light emitting element, and the third light emitting element; and
a fifth light emitting element to which power is supplied in such a way as to be turned on at different timing from the first light emitting element, the second light emitting element, the third light emitting element, and the fourth light emitting element;
wherein the first light emitting element, the second light emitting element, and the third light emitting element are arranged at substantially equal intervals at rotationally symmetric positions around a center of an optical axis of the lens unit,
wherein the fourth light emitting element is arranged between the first light emitting element and the second light emitting element, and wherein the fifth light emitting element is arranged between the second light emitting element and the third light emitting element.

8. The imaging device according to claim 7, further comprising:
a control unit configured to control power supply to the first light emitting element, the second light emitting element, the third light emitting element, the fourth light emitting element, and the fifth light emitting element;
wherein the control unit includes
a determination unit configured to determine a light amount of a captured image, and
an acquisition unit configured to acquire an imaging field angle in a case where the light amount determined by the determination unit is not larger than a predetermined amount;
wherein the control unit performs control to supply power to the first light emitting element, the second light emitting element, and the third light emitting element in a case where the imaging field angle acquired by the acquisition unit is wider than a predetermined field angle and supply power to the fourth light emitting element or the fifth light emitting element in a case where the imaging field angle acquired by the acquisition unit is not wider than the predetermined field angle.

9. An imaging device comprising:
a lens unit;
an imaging unit configured to convert light with which an image is formed by the lens unit into an image signal;
a housing configured to house the lens unit and the imaging unit and having a rectangular shape as viewed in a direction of an optical axis of the lens unit;
a pair of first light emitters arranged diagonally across the lens unit at positions corresponding to corners of the housing respectively; and
a second light emitter and a third light emitter arranged diagonally across the lens unit at positions corresponding to different corners of the housing respectively, said different corners being different from the corners where the first light emitters are arranged;
wherein the pair of first light emitters have a light distribution angle smaller than that of the second light emitter and that of the third light emitter; and
wherein the second light emitter has a light distribution angle smaller than that of that of the third light emitter.

10. The imaging device according to claim 9, further comprising:
a control unit configured to control power supply to the pair of first light emitters, the second light emitter and the third light emitter;
wherein the control unit performs control to supply power exclusively such that one of the pair of first light emitters, the second light emitter, and the third light emitter is turned on.

11. The imaging device according to claim 9,
wherein the control unit includes
a determination unit configured to determine a light amount of a captured image, and
an acquisition unit configured to acquire an imaging field angle in a case where the light amount determined by the determination unit is not larger than a predetermined amount;
wherein the control unit performs control to supply power to the pair of first light emitters in a case where the imaging field angle acquired by the acquisition unit is narrower than a predetermined field angle and supply power to the second light emitter or the third light emitter in a case where the imaging field angle acquired by the acquisition unit is not narrower than the predetermined field angle.

12. An imaging device comprising:
a lens unit;
an imaging unit configured to convert light with which an image is formed by the lens unit into an image signal;
a housing configured to house the lens unit and the imaging unit and having a rectangular shape as viewed in a direction of an optical axis of the lens unit;
a pair of first light emitters arranged diagonally across the lens unit at positions corresponding to corners of the housing respectively;
a second light emitter and a third light emitter arranged diagonally across the lens unit at positions corresponding to different corners of the housing respectively, said different corners being different from the corners where the first light emitters are arranged; and
a control unit configured to control power supply to the first light emitters, the second light emitter, and the third light emitter;
wherein the control unit performs control to supply power exclusively such that one of the pair of first light emitters, the second light emitter, and the third light emitter is turned on.

13. The imaging device according to claim 12,
wherein the control unit includes
a determination unit configured to determine a light amount of a captured image, and
an acquisition unit configured to acquire an imaging field angle in a case where the light amount determined by the determination unit is not larger than a predetermined amount;
wherein the control unit performs control to supply power to the pair of first light emitters in a case where the imaging field angle acquired by the acquisition unit is narrower than a predetermined field angle and supply power to the second light emitter or the third light emitter in a case where the imaging field angle acquired by the acquisition unit is not narrower than the predetermined field angle.

14. The imaging device according to claim 12, further comprising:
a first substrate on which one of the pair of first light emitters and the second light emitter are arranged; and
a second substrate on which the other of the pair of first light emitters and the third light emitter are arranged.

15. An imaging device comprising:
a lens unit;
an imaging unit configured to convert light with which an image is formed by the lens unit into an image signal;
a housing configured to house the lens unit and the imaging unit and having a rectangular shape as viewed in a direction of an optical axis of the lens unit;
a pair of first light emitting elements arranged diagonally across the lens unit at positions corresponding to corners of the housing respectively and configured to adjust a first light distribution angle;
a second light emitting element and a third light emitting element arranged diagonally across the lens unit at positions corresponding to different corners of the housing respectively, said different corners being different from the corners where the first light emitting elements are arranged, the second light emitting element being configured to adjust a second light distribution angle and the third light emitting element being configured to adjust a third light distribution angle;
wherein the pair of first light emitting elements adjust the first light distribution angle so that the first light distribution angle of the pair of first light emitting elements is smaller than the second light distribution angle of the second light emitting element and the third light distribution angle of the third light emitting element; and
wherein the second light emitting element adjusts the second light distribution angle so that the second light distribution angle of second light emitting element is smaller than the third light distribution angle of the third light emitting element.

* * * * *